United States Patent

Kawara

[11] Patent Number: 6,069,993
[45] Date of Patent: May 30, 2000

[54] IMAGE INFORMATION DECODING AND REPRODUCING APPARATUS AND METHOD

[75] Inventor: Toshiyuki Kawara, Hirakata, Japan

[73] Assignee: Matsushita Electric Industrial Co., Ltd., Osaka, Japan

[21] Appl. No.: 08/922,463

[22] Filed: Sep. 3, 1997

[30] Foreign Application Priority Data

Sep. 4, 1996 [JP] Japan .................................. 8-234024

[51] Int. Cl.[7] .................................................. H04N 5/91
[52] U.S. Cl. ............................................ 386/68; 386/111
[58] Field of Search ................................ 386/6–8, 33, 68, 386/81–82, 111–112, 125–126, 109, 95, 104, 124, 108, 98, 27; 348/409, 410, 411, 412, 415

[56] References Cited

U.S. PATENT DOCUMENTS 5,841,941 11/1998 Morimoto et al. ..................... 386/95
5,974,225 10/1999 Iwamoto et al. ........................ 386/109

*Primary Examiner*—Wendy Garber
*Assistant Examiner*—Christopher Onuaku
*Attorney, Agent, or Firm*—Wenderoth, Lind & Ponack, L.L.P.

[57] ABSTRACT

An image information decoding and reproducing apparatus and method reproduces images in reverse sequence when a plurality of images is compressed to a single image unit and recorded to a disc-shaped recording medium. When the j-th picture from the beginning of an i-th access unit is reproduced, an image information reading section reads the two access units from (i−1)th access unit to i-th access unit, an image decoding section decodes images, and a decoded picture counter counts the number of pictures decoded after the counter has counted a particular value, e.g., 2. An image output section then outputs the picture decoded when the count detected by the decoded picture counter reaches a particular value. Reverse sequence reproduction is thereafter achieved by successively reducing the values of j and i.

10 Claims, 9 Drawing Sheets

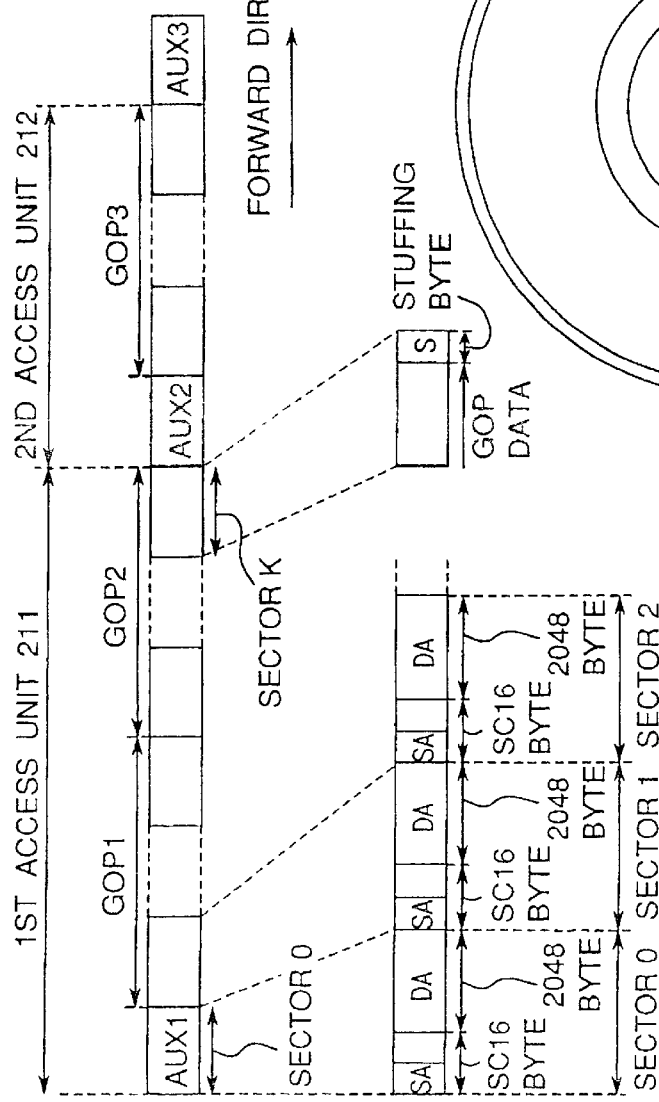
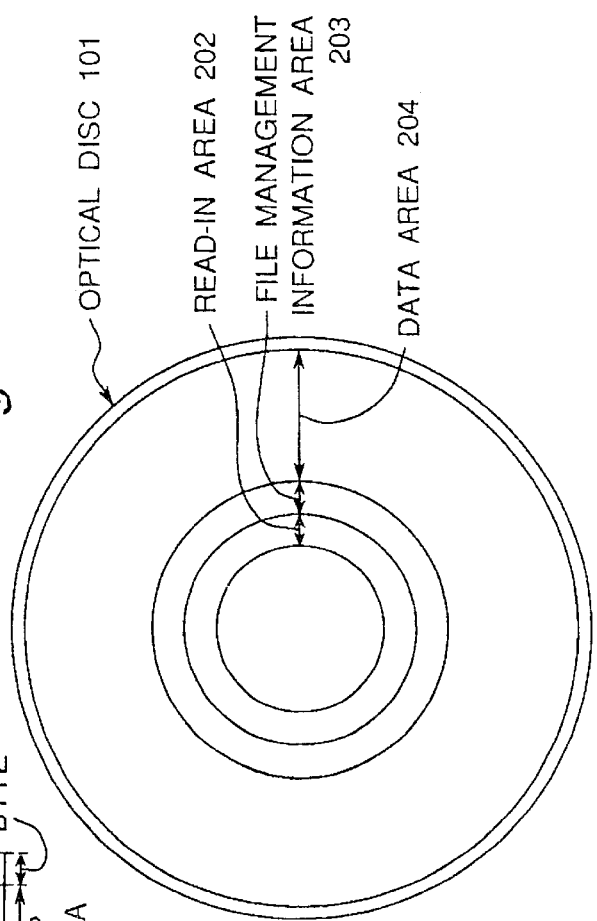

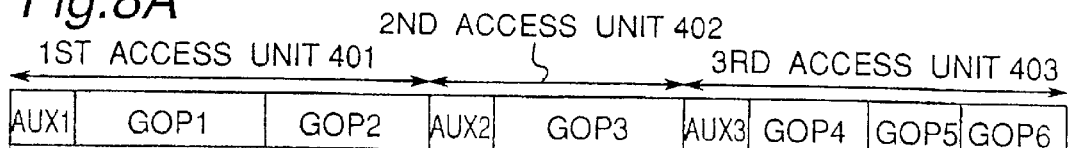
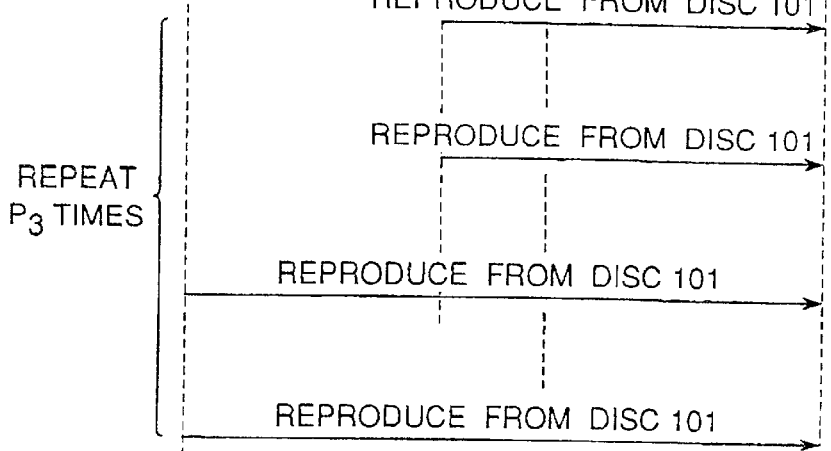
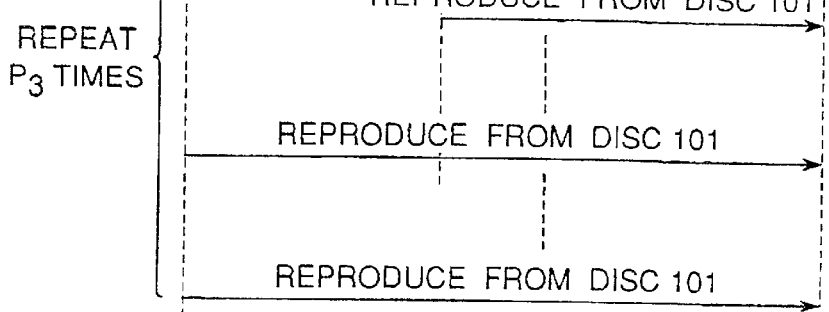
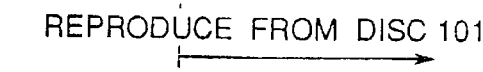
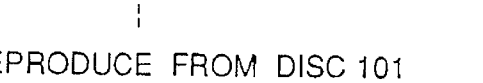

IMAGE INFORMATION DECODING AND REPRODUCING APPARATUS AND METHOD

BACKGROUND OF THE INVENTION

The present invention relates to an image information decoding and reproducing apparatus used for reproducing an image signal recorded to a disc after compression coding, and relates particularly to an image information decoding and reproducing apparatus and image information decoding and reproducing method for reproducing an image sequence in reverse order.

SUMMARY OF THE INVENTION

The development of digital storage media has been accompanied by the development of various methods for compressing and recording movies and other moving pictures, particularly those with long playing times, to these types of recording media as a means of effectively increasing storage capacity. Advances in compression techniques have helped achieve digital storage media capable of recording full-length movies. The Moving Picture Experts Group (MPEG), formed under the auspices of the International Organization for Standardization (ISO) and the International Electrotechnical Commission (IEC), has worked to standardize moving picture coding methods. One of these has been published as the MPEG-2 Standard, formally known as ISO/IEC 13818, which includes part 13818-2 for video.

The MPEG coding algorithm uses both non-predictive intrapicture coding compression (referred to in the Standard and below as "intra coding"), and interpicture predictive coding (similarly, "nonintra coding") with motion compensation based on a picture before and/or after the current picture in time. Nonintra coding is particularly effective for compressing moving picture information, but makes it difficult to achieve random access image reproduction because of its dependence on information about a picture before or after the current picture in time. However, this random access problem is largely overcome by using an image compression unit called a Group of Pictures (GOP) which comprises plural consecutive pictures with intra coding always used to code the first picture in the GOP.

It should be noted that, for simplicity, the following explanation is based on the MPEG standard, and "picture" is used in reference to a single frame when in the MPEG frame mode and a single field when in the MPEG field mode.

As shown in FIG. 9A, each GOP may comprise three types of coded pictures: I-pictures (intra-coded pictures) that are coded independently without reference to other pictures; P-pictures (predictive-coded pictures) that are based on temporally preceding I- or P-pictures; and B-pictures (bidirectionally predictive-coded pictures) that are based on the nearest preceding and/or following I- or P-picture(s) in the sequence. Note that in the example shown in FIG. 9A one GOP comprises twelve pictures with every third picture following the I-picture being a P-picture.

Note that the I-pictures in this sequence can be decoded and reproduced without reference to any other pictures in the sequence because they are intra coded. The P-pictures, on the other hand, are nonintra coded with reference to a temporally preceding I- or P-picture, and the temporally preceding I- or P-picture from which the current P-picture was predicted must therefore be decoded before the current P-picture can be decoded. Furthermore, B-pictures are non-intra coded with reference to a temporally preceding and/or following I- or P-picture, and the picture or pictures from which the current B-picture was predicted must be decoded before the current B-picture can be decoded. The pictures are therefore coded in the sequence shown in FIG. 9B.

A problem with this coding sequence is that reproduction in reverse sequence is difficult. More specifically, pictures cannot be correctly decoded by simply reversing the reproduction sequence of the recording medium on a picture unit basis, and the picture-by-picture reproduction sequence is not reversed by reversing the reproduction sequence of the recording medium on a GOP unit basis. For example, the B-pictures of frames 10 and 11 in FIG. 9B are decoded using the P-picture of frame 9 and the I-picture of frame 12. However, the P-picture of frame 9 belongs to an image associated with a different GOP, and has not been decoded at the point frames 10 and 11 are to be decoded if the sequence is reversed by simply reversing the order of GOP reproduction.

It is therefore not possible to decode the B-picture images of frames 10 and 11 in reverse sequence using this model.

With consideration for this problem, an object of the present invention is therefore to provide an image information decoding and reproducing apparatus and an image information decoding and reproducing method capable of reproducing an image sequence, such as that recorded by the MPEG Standard picture, by picture in reverse sequence.

To achieve this object, an image information decoding and reproducing apparatus according to the present invention comprises an image information reading means with an ability for reading one or a plurality of access units of image information recorded to the recording medium from a specified access unit; an image decoding means for decoding the image information read by the image information reading means; an access unit beginning counter for counting the beginning of each access unit contained in the image information read by the image information reading means; a decoded picture counter for counting the number of pictures decoded by the image decoding means after the count detected by the access unit beginning counter reaches a particular value; and an image output means for outputting the decoded picture decoded by the image decoding means when the count detected by the decoded picture counter reaches a particular value, and continuing to output said decoded picture until decoding the next picture to be displayed is completed.

An image information decoding and reproducing method achieving the above object of the invention comprises reading (1+n) access units from (i−n)th access unit where n is zero or a natural number; decoding input image information; detecting a beginning of (1+n)th access unit contained in the input image information; counting a number of pictures decoded since the beginning of (1+n)th access unit was detected; and outputting the picture decoded when the number of the decoded picture becomes j, and continuing to output said decoded picture until decoding a next picture to be displayed is completed.

When the j-th picture from the beginning of an i-th access unit is reproduced by the image information decoding and reproducing apparatus of the invention, the image information reading means reads the two access units from (i−1)th access unit to i-th access unit, the image decoding means then decodes images, and the decoded picture counter counts the number of pictures decoded after the count detected by an access unit beginning counter reaches a particular value, e.g., 2. The image output means then outputs the picture decoded when the count detected by the decoded picture counter reaches a particular value, and continues to output said decoded picture until decoding the next picture to be displayed is completed. Reverse sequence reproduction is thereafter achieved by successively reducing the values of j and i.

More specifically, the data in the preceding access unit and the current access unit required to reproduce a given access unit is supplied to the decoder as many times as there are pictures in the access unit to be reproduced. It is therefore possible to decode and reproduce in reverse order all pictures in a moving picture sequence even when the image sequence contains inter coded pictures requiring information from an image in a preceding access unit for decoding.

By using ancillary or auxiliary information added to the beginning of the access units for access unit detection, address information identifying the sector containing the next previous access unit can also be reproduced and used to move the optical pickup and thereby achieve high speed reverse reproduction operating modes.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2A is a diagram used to describe the format of the image signal recorded to a recording medium.

FIG. 2B is a diagram showing a format of a disc-shaped recording medium.

FIGS. 8A, 8B, 8C, 8D, 8E, 8F, 8G, 8H and 8I are charts used to describe the data supplied to the system decoder during reproduction in the reverse direction according to the flow chart shown in FIG. 7.

DESCRIPTION OF THE PREFERRED EMBODIMENTS

The preferred embodiments of the present invention are described below with reference to the accompanying figures.

Figure 1:
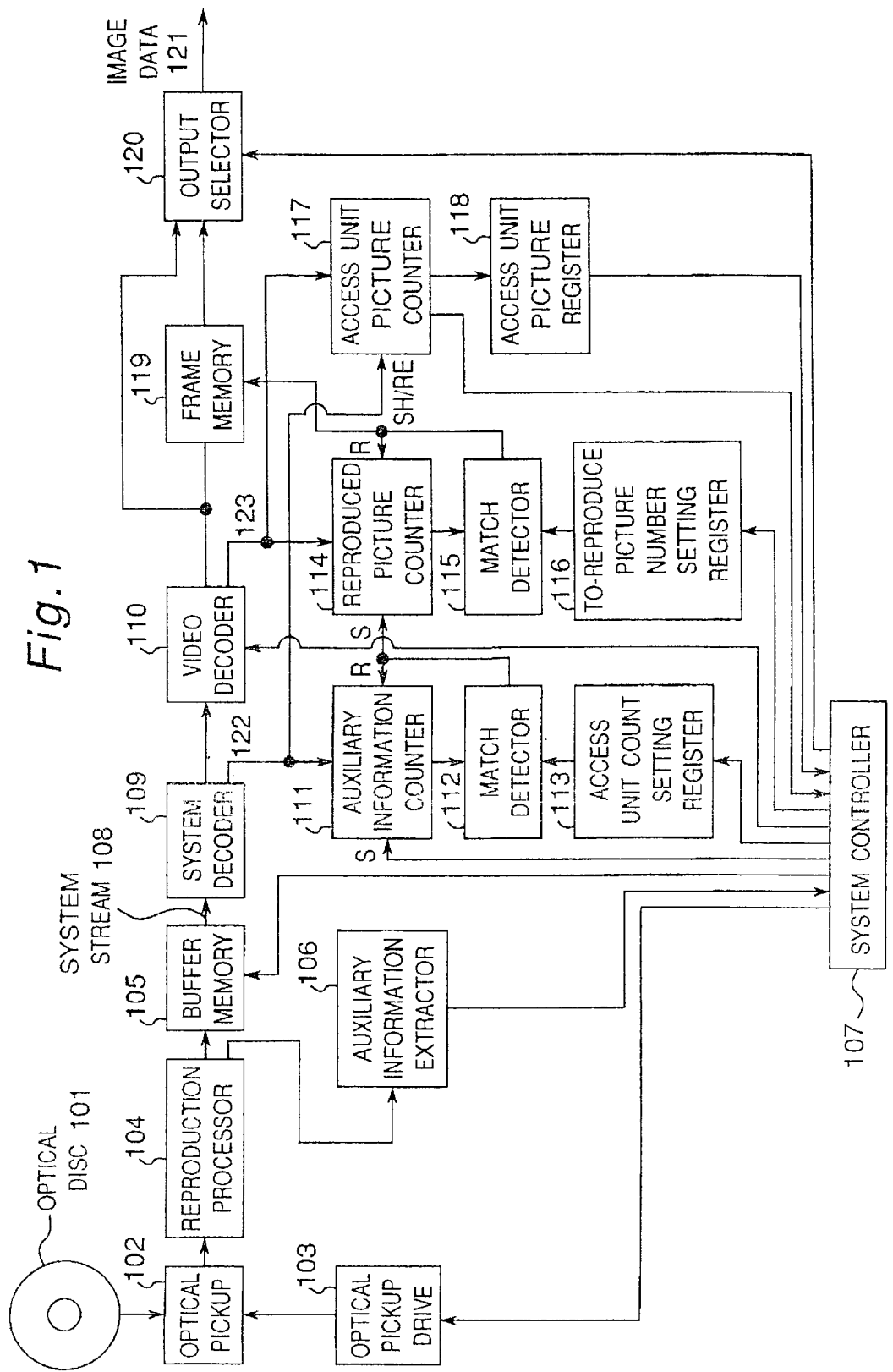
FIG. 1 is a block diagram of an image information decoding and reproducing apparatus according to a preferred embodiment of the present invention.
Figure 3:
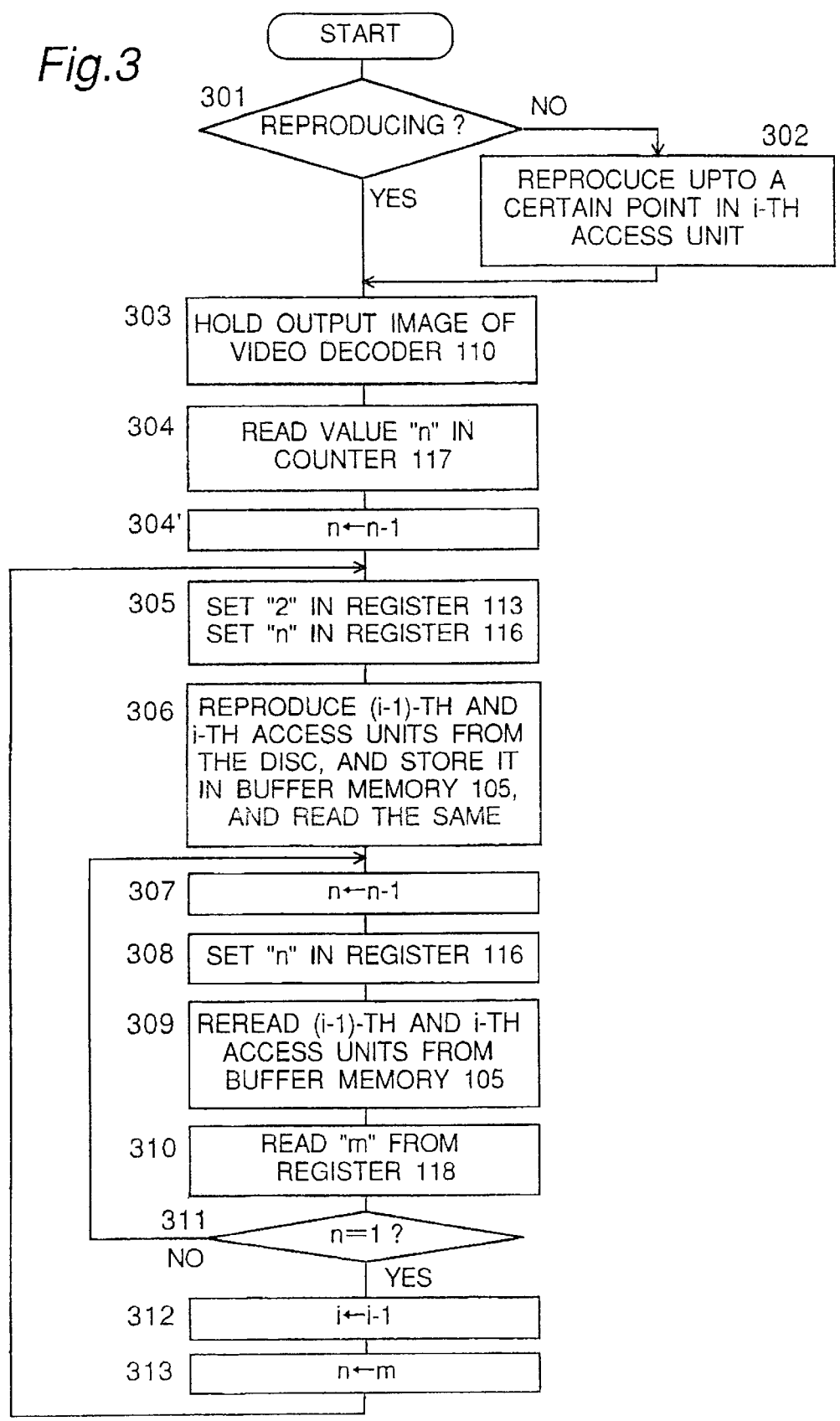
FIG. 3 is a flow chart used to describe the operation of an image information decoding and reproducing apparatus according to the first embodiment of the present invention.

FIG. 1 is a block diagram of an image information decoding and reproducing apparatus according to a preferred embodiment of the present invention. As shown in FIG. 1, an image information decoding and reproducing apparatus according to a preferred embodiment of the invention outputs image data 121 from an output selector 120 after processing an image signal read by an optical pickup 102 from an optical disc 101 using an optical pickup drive 103, reproduction processor 104, buffer memory 105 from which the system stream 108 flows to the system decoder 109, ancillary or auxiliary information extractor 106, system controller 107, video decoder 110, auxiliary information counter 111, match detector 112, access unit count setting register 113, reproduced picture counter 114, match detector 115, to-reproduce picture number setting register 116, access unit picture counter 117, access unit picture count register 118, and frame memory 119.

The operation of an image information decoding and reproducing apparatus thus comprised is described next below. It should be noted, however, that while an optical disc 101 is used as the recording medium in the preferred embodiments described below, the invention shall not be so limited and other types of recording media can obviously be used.

During normal reproduction, the signal reproduced from the optical disc 101 by the optical pickup 102 is supplied to the reproduction processor 104 for binarization, digital demodulation, error correction, or other signal processing operations. The processed signal data is then supplied from the reproduction processor 104 to the buffer memory 105 and auxiliary information extractor 106. The capacity of the buffer memory 105 is, for example, sufficient to store the data for two access units. The auxiliary information extracted by the auxiliary information extractor 106 includes various control data as described further below, and is output by the auxiliary information extractor 106 to the system controller 107 for system control.

The output of data stored to the buffer memory 105 is controlled by commands from the system controller 107, thus generating the system stream 108 supplied to the system decoder 109. The system decoder 109 separates the system stream 108 into, for example, a compressed video stream and compressed audio stream according to a known model, and supplies the separated signal streams to respective decoders. It should be noted that the model used by an exemplary system decoder 109 in the present embodiment is, by way of example only, the MPEG-2 Systems standard defined as ISO/IEC 13818-1. Note, further, that only the video decoder 110 is shown in FIG. 1, and other decoders are omitted.

The video decoder 110 in this embodiment thus decodes the video stream according to the MPEG-2 Video standard defined as ISO/IEC 13818-2, and supplies the decoded signal to the output selector 120 and the frame memory 119. During normal, i.e., forward direction, reproduction, the output selector 120 is switched to output the signal from the video decoder 110, and the decoded signal from the video decoder 110 is thus output as the image data 121 by way of the output selector 120.

During reverse direction reproduction, the output selector 120 is switched to output the signal from the frame memory 119, and the decoded signal from the frame memory 119 is thus output as the reverse image data 121 by way of the output selector 120.

Operation during reverse direction reproduction is further described below, but it is first necessary to briefly describe the recording format of the optical disc 101.

The format of the image signal reproduced from a disc-shaped recording medium by an image information decoding and reproducing apparatus according to the present embodiment is shown in FIG. 2A. The data is recorded to a spiral recording track formed on the optical disc 101 surface shown in FIG. 2B. The optical disc 101 is spun by a motor, and an optical head for reading the recorded data is moved across the optical disc 101 relative to the recording track. During normal (forward) reproduction, the optical head moves from left to right as seen in FIG. 2A from first access unit 211 to second access unit 212.

As shown in FIG. 2A, the GOP (group of pictures) data (GOP1, GOP2, GOP3, etc.) and auxiliary data (AUX1, AUX2, AUX3, etc.) are each recorded in a sector. Each sector is a segment of the recording track on the optical disc 101. As shown in FIG. 2B, the optical disc 101 is segmented from the inside circumference area to the outside circumference area of the disc into a lead-in area 202, file management information area 203, and a data area 204 to which the GOP data and auxiliary data are recorded.

Each sector comprises a 16-byte subcode SC and a 2048-byte data area DA. The subcode SC is disposed immediately before the data area DA, and contains a 4-byte sector address SA expressing an integer value uniquely identifying each sector. In FIG. 2A the sector address SA numbers are shown as the numeric suffixes 0, 1, and 2.

It should be noted that such positional references as "previous" and "before," e.g., the disposition of the subcode SC immediately before the data area DA, in the present specification indicate a temporally earlier position during normal reproduction, i.e., a position that is reached by the optical head and reproduced first when data is reproduced in the normal forward direction. Likewise, positional references such as "following" and "after" indicate a temporally later position during normal reproduction.

Figures 9A, 9B:
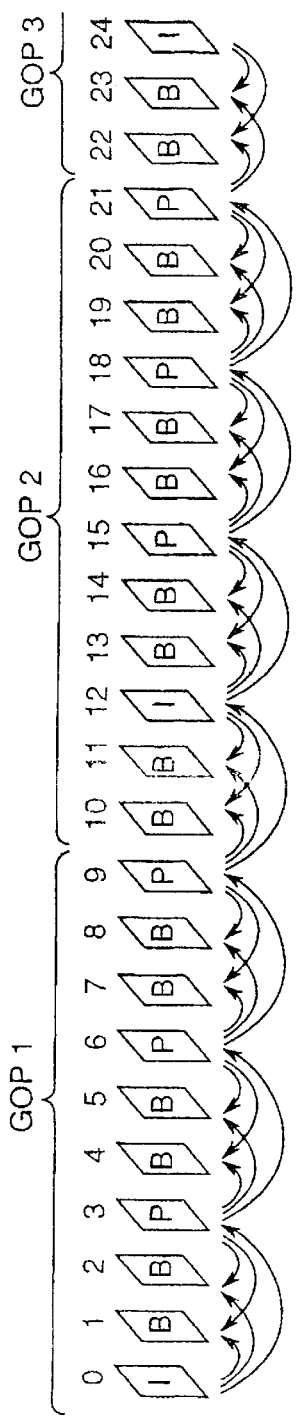
FIG. 9A is a diagram used to describe the data supplied to the system decoder.
FIG. 9B is a table showing the sequence of pictures coded.

GOP1 in FIG. 2A comprises both intra coded picture data (I-pictures) and inter coded picture data (P-pictures and B-pictures) as defined in the MPEG-2 standard, such as shown in FIG. 9A. As shown in FIG. 9A, I-pictures can be reproduced by itself, but P-pictures and B-pictures are reproduced with reference to some neighboring pictures located before and after the P- or B-picture to be reproduced. For example, I-picture 0 or I-picture 12 shown in FIG. 9A, can be reproduced by itself. However, B-picture 11 in GOP2 can be reproduced with reference to I-picture 12 and P-picture 9. P-picture 9, in turn, can be reproduced with reference to P-picture 6, which can be reproduced with reference to P-picture 3, which can be reproduced with reference to I-picture 0. This implies that in order to completely reproduce any one picture, such as B-picture 11, it is necessary to collect data from at least two GOPs such as GOP1 and GOP2, provided that one repetition span between two consecutive I-pictures is no greater than two GOPs.

Figure 4:
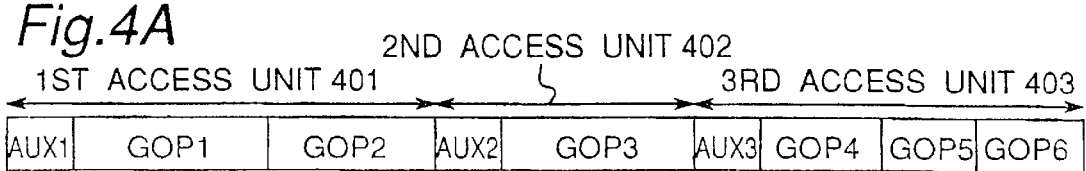
FIGS. 4A, 4B, 4C, 4D, 4E and 4F are charts used to describe the data supplied to the system decoder during reproduction in the reverse direction according to the flow chart shown in FIG. 3.

Also, as apparent to those skilled in the art, picture boundaries do not necessarily match the sector boundaries. In addition, one access unit comprises one or a plurality of GOPs. For example, the first access unit 401 shown in FIG. 4 comprises GOP1 and GOP2, while the second access unit 402 comprises only GOP3. As stated above, since at least two GOPs are necessary to completely reproduce any one picture, it is necessary to access at least two access units to completely reproduce any one picture, provided that the access unit is the minimum unit that can be accessed.

Note that one or a plurality of stuffing bytes S are recorded to that part of a sector K where GOP data is not recorded following the last GOP in the sector, e.g., GOP2 in FIG. 2A. The end of the first access unit 211, more specifically the end of the last GOP in the access unit, thus matches the end of the sector (sector K in FIG. 2A).

An auxiliary data packet AUX1 is recorded to the first sector (e.g., sector 0 in FIG. 2A) of every access unit on the optical disc 101. The auxiliary data AUX contains non-picture data, i.e., does not contain I-, P-, or B-picture data. More specifically, the auxiliary data AUX contains such control information as the address of the sector containing the previous block of auxiliary data AUX, the address of the sector containing the following block of auxiliary data AUX, and jump destination address information such as the address of the sector containing the n-th previous or n-th following block of auxiliary data AUX. Note that these auxiliary data packets AUX are packets conforming to the system stream defined by MPEG-2 ISO/IEC 13818-1.

The operation of an image information decoding and reproducing apparatus comprised as shown in FIG. 1 during special reproduction operations using an optical disc 101 containing data recorded as explained above is described next below.

Special reproduction using only I-pictures at the beginning of the access units is described first briefly below.

In the case described below the auxiliary data AUX disposed at the beginning of the access unit currently read during normal reproduction has already been extracted by the auxiliary information extractor 106, and a high speed reproduction command has been applied by the user. As a result, the reading position is jumped to the desired sector using the jump destination address information contained in the extracted auxiliary data AUX.

The high speed reproduction command applied by the user is input to the system controller 107 using an input interface (not shown in the figures). The system controller 107 thus selects one of the jump destination addresses extracted by the auxiliary information extractor 106, e.g., the address of the sector containing the next following auxiliary data AUX, and instructs the optical pickup drive 103 to move the optical pickup 102 to the specified sector. When the optical pickup 102 is thus repositioned to the specified sector, one access unit (in this example, the following access unit) is read, the auxiliary data AUX at the beginning of the access unit is extracted by the auxiliary information extractor 106, and I-picture decoding by the video decoder 110 is accomplished. Immediately after the I-picture is reproduced, the optical pickup 102 is again jumped to the next access unit based on the extracted auxiliary data AUX. This sequence of pickup jumping and I-picture reproduction operations is thereafter repeated to reproduce I-pictures at high speed in the normal forward direction.

It should be noted that while the sector address of the next auxiliary data AUX is used for the jump destination address in the above operation, the speed of the high speed reproduction operation, i.e., the ratio to the normal reproduction rate, can be varied by selectively using the jump destination address information contained in the auxiliary data AUX. Furthermore, while reproduction in the forward direction is described above, I-picture reproduction in the reverse direction can be accomplished in the same manner. High speed reproduction of only the first picture in each access unit can thus be accomplished in both forward and reverse directions.

Before explaining the operations, functions of the blocks shown in FIG. 1 are further described.

The auxiliary information extractor 106 extracts the access unit data and detects the access unit address or number which is indicative of the location of the disc. The buffer memory 105 in FIG. 1 has a capacitor to store at least two access units.

System decoder 109 produces GOP data one after the other to video decoder 110. System decoder 109 also detects auxiliary data AUX, and produces a pulse in response to each detection of auxiliary data AUX through line 122. Counter 111 counts the number of pulses representing access units from the system decoder 109, and the counted result is applied to a comparator, the match detector 112. The match detector 112 compares the counted result with a predetermined number set in the register 113. When the counted result becomes equal to the number set in the register 113, the match detector 112 produces a pulse which is used for resetting the counter 111 to zero and also for start counting counter 114 from zero. Counter 111 is reset to zero and stops counting after receiving the reset pulse. Counter 111 starts count by a pulse from system controller 107.

Video decoder 110 produces I-, B- or P-picture data to frame memory 119. Video decoder 110 also produces a pulse through line 123 in response to each detection of a picture which may be I-, B- or P-picture. Counter 114 counts the number of pulses representing pictures from the video decoder 110, and the counted result is applied to a comparator, the match detector 115. The match detector 115 compares the counted result with a predetermined number set in the register 116. When the counted result becomes equal to the number set in the register 116, the match detector 115 produces a pulse which is used for resetting the counter 114 to zero and also for capturing the I-, B- or P-picture data presently applied to the frame memory. After counter 114 is reset to zero, counter 114 stops counting.

The pulses from video decoder 110 are also applied to counter 117 for counting the number of pictures in one access unit. After counting the number of pictures in one access unit, the counted result is shifted to the register 118. Thus, the register 118 holds the number of pictures in one previous access unit. A pulse from line 122 produced after every access unit is used for shifting the counted result from counter 117 to register 118, and also for resetting the counter 117 to zero. The counted result as counted by counter 117 and shifted to register 118 is generally indicated as m. Thus, m represents the number of pictures in one previous access unit.

Referring to FIGS. 3 and 4A–4K, operations for picture by picture reproduction in the normal speed reverse direction according to the first embodiment are described below.

It is assumed that, while the disc is being reproduced in the normal forward direction, a command for reverse picture-by-picture (no picture skipping) reproduction is received at point X. It is assumed that the point X is located at the 24th picture in the third access unit 403, as shown in FIG. 4A. The reverse reproduction starting access unit is generally indicated by i-th access unit, and the reverse reproduction starting picture is generally indicated by n-th picture. Thus, in the above example, i=3 and n=24.

At step 301, it is checked whether forward reproduction is currently in progress. If it is not, i.e., if reproduction is stopped, for example, the (i−1)th and i-th access units are reproduced (step 302). The reproduction of (i−1)th access unit is necessary because it is necessary to know the exact number of pictures contained in the (i−1)th access unit, and this number will be stored in the register 118 after reproducing the (i−1)th access unit completely.

At step 303, the picture at point X (24th picture) is held in frame memory 119 and send out through selector 120 for being reproduced on a screen.

At step 304, n (=24) is read from counter 117, and at step 304', n is decremented to (n−1) (=23).

At step 305, a predetermined number, such as 2 is set in register 113, and new n (=23) is set in register 116. The number 2 as set in register 113 is determined by the number of access units necessary to reproduce one picture completely. As explained above, at least two access units are necessary to completely reproduce one picture.

At step 306, (i−1)th and i-th access units, i.e., second and third access units in the above example, are reproduced from disc 101 and the entire data in these two access units are stored in buffer memory 105, and immediately thereafter, the data is read out to system decoder 109. This read out operation is shown in FIG. 4B.

During the read out of the two access units, the system decoder 109 produces two pulses along line 122 in response to the detection of auxiliary data AUX2 and AUX3. When the second pulse is produced in response to data AUX3, the counted result two (2) in counter 111 and the number two (2) stored in register 113 match. Thus, the match detector 112 produces a pulse for resetting the counter 111, and at the same time, for start counting the counter 114. Thus, counter 114 starts counting the number of pictures in the third access unit 403. When the counter 114 counts up to 23, this matches with the number stored in register 116. Thus, the match detector 115 produces a pulse for resetting the counter 114, and also for holding the 23rd picture in frame memory 119. The 23rd picture held in frame memory 119 is send out through selector 120 and is reproduced on a screen. It is noted that the operation from step 303 to step 306 is carried out in a very short time, such as in 1/60 second.

At step 307, n is decremented by one. Thus, n is now reduced to 22.

At step 308, n (=22) is stored in register 116.

At step 309, (i−1)th and i-th access units are read not from the optical disc 101, but from those data stored in buffer memory 105. This read out operation is shown in FIG. 4C.

During the read out of the two access units, the system decoder 109 produces two pulses along line 122 in response to the detection of auxiliary data AUX2 and AUX3. When the second pulse is produced in response to data AUX3, the counted result two (2) in counter 111 and the number two (2) stored in register 113 match. Thus, the match detector 112 produces a pulse for resetting the counter 111, and at the same time, for start counting the counter 114. Thus, counter 114 starts counting the number of pictures in the third access unit 403. When the counter 114 counts up to 22, this matches with the number stored in register 116. Thus, the match detector 115 produces a pulse for resetting the counter 114, and also for holding the 22nd picture in frame memory 119. The 22nd picture held in frame memory 119 is send out through selector 120 and is reproduced on a screen. It is noted that the operation from step 307 to step 309 is carried out in a very short time, such as in 1/60 second.

At step 310, m is read from register 118. It is assumed that the total number of pictures in the second access unit is 36. Thus, according to this example, m=36. It should be noted that the value of m obtained in step 310 remains unchanged insofar as the value of i does not change, and the process of step 310 thus needs to be executed at least once for a given i value. In other words, step 310 can be omitted for the second and subsequent executions of the process loop comprising steps 305 to 313.

At step 311, it is determined whether or not n=1, i.e., whether or not the picture currently being displayed is the first picture in i-th access unit. If n does not equal to 1, the picture currently being displayed is not the first picture in i-th access unit. The reproduction process therefore loops back to step 307, at which the value of n stored in register 116 is decremented by one. In this manner, the reproduction process using data from buffer memory 105 is repeated P3 times, as shown in FIG. 4D. In the above example, P3=23, as the number of pictures to be reproduced in the third access unit 403 is 24, in which the first reproduction is carried out by the direct reading from the disc 101, and the remaining 23 reproductions are carried out by the read out data from buffer memory 105.

On the other hand, if n=1 at step 311, the picture currently being displayed is the first picture in i-th access unit, and control advances to step 312.

At step 312, the value of i is then decremented by one. Thus, i is reduced to two (2) in the above example, to set the access unit to be the one before the presently processed access unit. Thus, the second access unit is now ready for being processed.

At step 313, the variable n to be stored to the register 116 is also reset to the value m, i.e., 36 in the above example, read from the register 118 in step 310 so that the last picture in the second access unit will be ready to be displayed next, and control then loops back to step 305.

At step 305, 2 is set in register 113 and n (=36) is set in register 116.

At step 306, (i−1)th and i-th access units, i.e., first and second access units because i is reduced to two in step 312, are reproduced from disc 101 and the entire data in these two access units are stored in buffer memory 105, and immediately thereafter, the data is read out to system decoder 109. This read out operation is shown in FIG. 4E.

During the read out of the two access units, the system decoder 109 produces two pulses along line 122 in response to the detection of auxiliary data AUX1 and AUX2. When the second pulse is produced in response to data AUX2, the counted result two (2) in counter 111 and the number two (2) stored in register 113 match. Thus, the match detector 112 produces a pulse for resetting the counter 111, and at the same time, for start counting the counter 114. Thus, counter 114 starts counting the number of pictures in the second access unit 402. When the counter 114 counts up to 36, i.e., to the last picture in the second access unit, 36 matches with the number stored in register 116. Thus, the match detector 115 produces a pulse for resetting the counter 114, and also for holding the 36th picture in frame memory 119. The 36th picture held in frame memory 119 is send out through selector 120 and is reproduced on a screen. It is noted that the operation from step 309 back to step 306 is carried out in a very short time, such as in 1/60 second.

At step 307, n is decremented by one. Thus, n is now reduced to 35.

At step 308, n (=35) is stored in register 116.

At step 309, (i−1)th and i-th access units are read not from the optical disc 101, but from those data stored in buffer memory 105. This read out operation is shown in FIG. 4F.

During the read out of the two access units, the system decoder 109 produces two pulses along line 122 in response to the detection of auxiliary data AUX1 and AUX2. When the second pulse is produced in response to data AUX2, the counted result two (2) in counter 111 and the number two (2) stored in register 113 match. Thus, the match detector 112 produces a pulse for resetting the counter 111, and at the same time, for start counting the counter 114. Thus, counter 114 starts counting the number of pictures in the second access unit 402. When the counter 114 counts up to 35, this matches with the number stored in register 116. Thus, the match detector 115 produces a pulse for resetting the counter 114, and also for holding the 35th picture in frame memory 119. The 35th picture held in frame memory 119 is send out through selector 120 and is reproduced on a screen.

At step 310, m is read from register 118. It is assumed that the total number of pictures in the first access unit is 48. Thus, according to this example, m=48.

At step 311, it is determined whether or not n=1. If no, the reproduction process loops back to step 307. In this manner, the reproduction process using data from buffer memory 105 is repeated P2 times, as shown in FIG. 4G. In the above example, P2=35, as the number of pictures to be reproduced in the second access unit 402 is 36, in which the first reproduction is carried out by the direct reading from the disc 101, and the remaining 35 reproductions are carried out by the read out data from buffer memory 105.

On the other hand, if n=1 at step 311, the picture currently being displayed is the first picture in i-th access unit, and control advances to step 312.

At step 312, the value of i is then decremented by one.

At step 313, the variable n to be stored to the register 116 is also reset to the value m, i.e., 48 in the above example, read from the register 118 in step 310 so that the last picture in the first access unit will be ready to be displayed next, and control then loops back to step 305.

In the first embodiment, the first picture in one access unit is formed by reading one previous access unit and said one access unit from the disc 101 (FIG. 4B), and the following reverse going pictures in said one access unit are formed by reading said one previous access unit and said one access unit from said buffer memory 105 (FIGS. 4C and 4D).

It should be noted that while the image information decoding and reproducing apparatus of the first embodiment is described above as reading data from the access unit immediately preceding the access unit containing the picture to be reproduced, it will be obvious that the data from said immediately preceding access unit is not always necessary. For example, as shown in FIG. 9A, while the data for the preceding GOP, which contains frames 0 to 9, is required to decode the images of frames 10 and 11 in the second GOP, no data from the preceding GOP is required to decode frames 12 to 21. In such cases it is possible to transfer only the data for the access unit containing the picture to be reproduced to the system decoder 109. In other words, if the data for the preceding access unit is not needed for reproduction, it is possible to resend only the i-th access unit. This embodiment is shown in FIGS. 5 and 6A–6K.

Referring to FIGS. 5 and 6A–6K, operations according to the second embodiment are described below.

Figure 6:
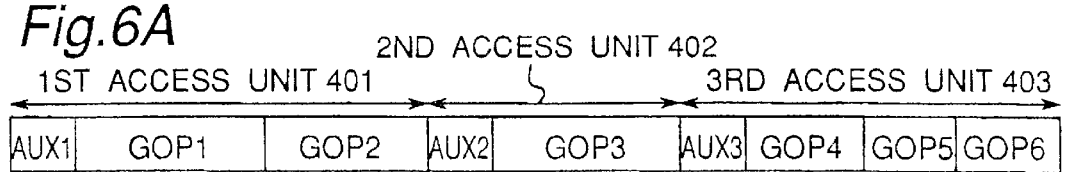
FIGS. 6A, 6B, 6C, 6D, 6E, 6F, 6G, 6H, 6I and 6K are charts used to describe the data supplied to the system decoder during reproduction in the reverse direction according to the flow chart shown in FIG. 5.

As in the first embodiment, it is assumed that the reverse picture-by-picture reproduction is carried out from point X (24th picture in the third access unit), as shown in FIG. 6A.

In the second embodiment, the first picture in one access unit is formed by reading one previous access unit and said one access unit from the disc 101 (FIG. 6B), and the following reverse going pictures in said one access unit except the last two pictures are formed by reading said one access unit from buffer memory 105 (FIGS. 6C and 6D), and the last two pictures in said one access unit are formed by reading said one previous access unit and said one access unit from said buffer memory 105 (FIGS. 6E and 6F).

Steps 501 to 505 are the same as above steps 301 to 304'. At step 501, it is checked whether forward reproduction is currently in progress.

At step 503, the picture at point X (24th picture) is held in frame memory 119 and send out through selector 120 for being reproduced on a screen.

At step 504, n (=24) is read from counter 117, and at step 505, n is decremented to (n−1) (=23).

At step 506, n (=23) is set in register 116.

At step 507, (i−1)th and i-th access units, i.e., second and third access units in the above example, are reproduced from disc 101 and the entire data in these two access units are stored in buffer memory 105, and immediately thereafter, the data is read out to system decoder 109. This read out operation is shown in FIG. 6B.

During the read out of the two access units, the match detector 112 produces a pulse in response to the detection of the auxiliary data AUX3 for resetting the counter 111, and at the same time, for start counting the counter 114. Thus, counter 114 starts counting the number of pictures in the third access unit 403. When the counter 114 counts up to 23, this matches with the number stored in register 116. Thus, the match detector 115 produces a pulse for resetting the counter 114, and also for holding the 23rd picture in frame memory 119. The 23rd picture held in frame memory 119 is send out through selector 120 and is reproduced on a screen.

At step 508, n is decremented by one. Thus, n is now reduced to 22.

At step 509, n (=22) is stored in register 116.

At step 510, it is detected whether or not n is greater than 2. If yes, the operation goes to step 511.

At step 511, 1 is set in register 113, and i-th access unit is read not from the optical disc 101, but from that stored in buffer memory 105. This read out operation is shown in FIG. 6C. Thereafter, in step 514 it is detected whether or not n=1. Steps 508, 509, 510, 511 and 514 are repeated P3 times, in the above example, P3=n−3=21 times, as shown in FIG. 6D.

Then, when n=2, the operation from step 510 goes to step 512.

At step 512, 2 is set in register 113, and (i−1)th and i-th access units are read not from the optical disc 101, but from that stored in buffer memory 105. These read out operation is shown in FIG. 6E.

During the read out of two access units, one previous picture is displayed as in a manner described above.

At step 515, the parameter i representing the access unit is decremented, and at step 516, m read from register 118 is stored as n.

Referring to FIGS. 7 and 8A–8I, operations for picture by picture reproduction in the normal speed reverse direction according to the third embodiment are described below. In the third embodiment, the buffer memory 105 shown in FIG. 1 can have less capacity. Note that the buffer memory 105 in this case is used to absorb data delays while waiting for disc rotation and movement of the optical pickup when jumping tracks.

In the third embodiment, the first and the following reverse going picture in one access unit except the last two picture are formed by reading said one access unit from the disc 101 (FIGS. 8B and 8C), and the last two pictures in said one access unit are formed by reading one previous access unit and said one access unit from the disc 101 (FIGS. 8D and 8E).

Figure 5:
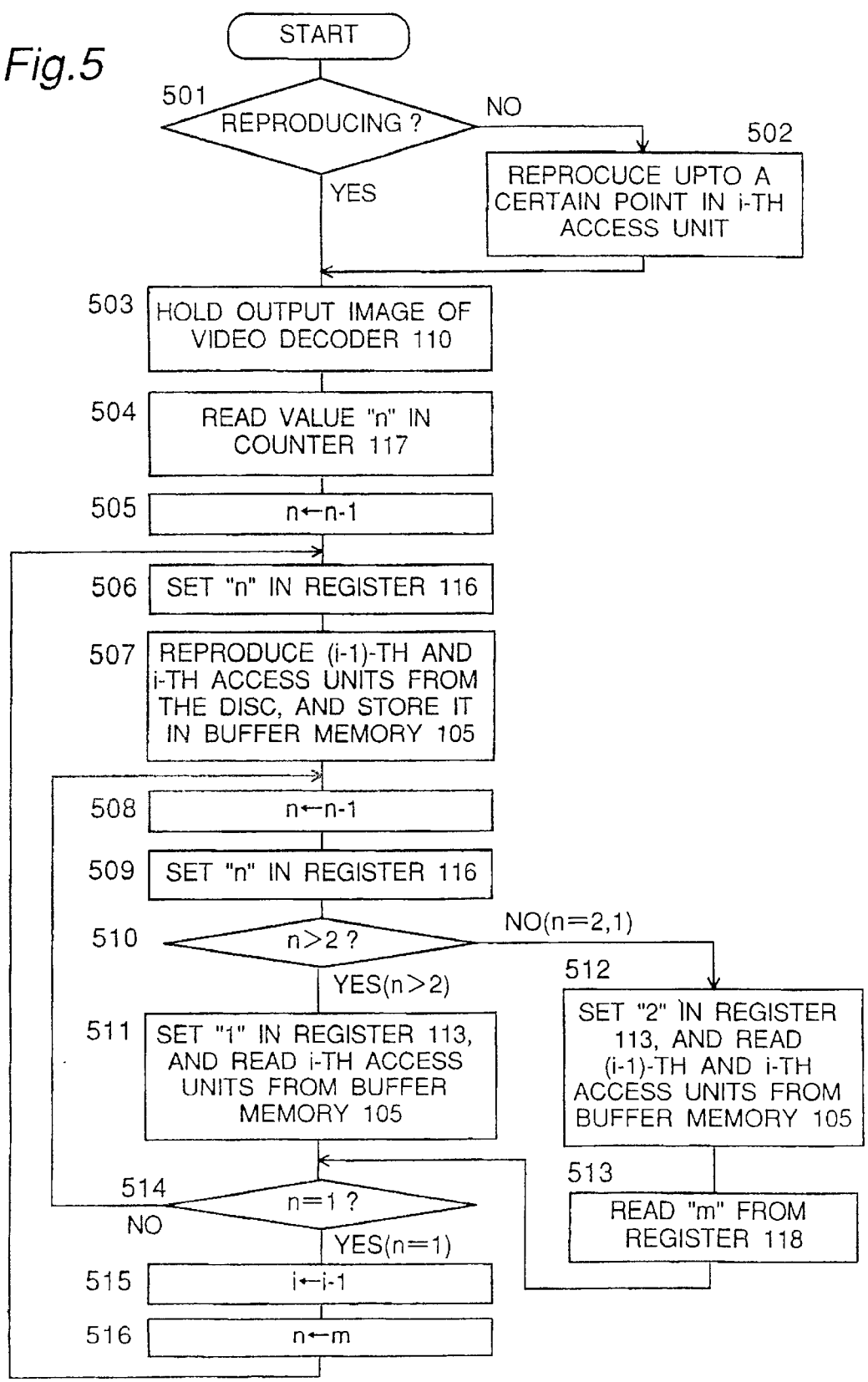
FIG. 5 is a flow chart used to describe the operation of an image information decoding and reproducing apparatus according to the second embodiment of the present invention.
Figure 7:
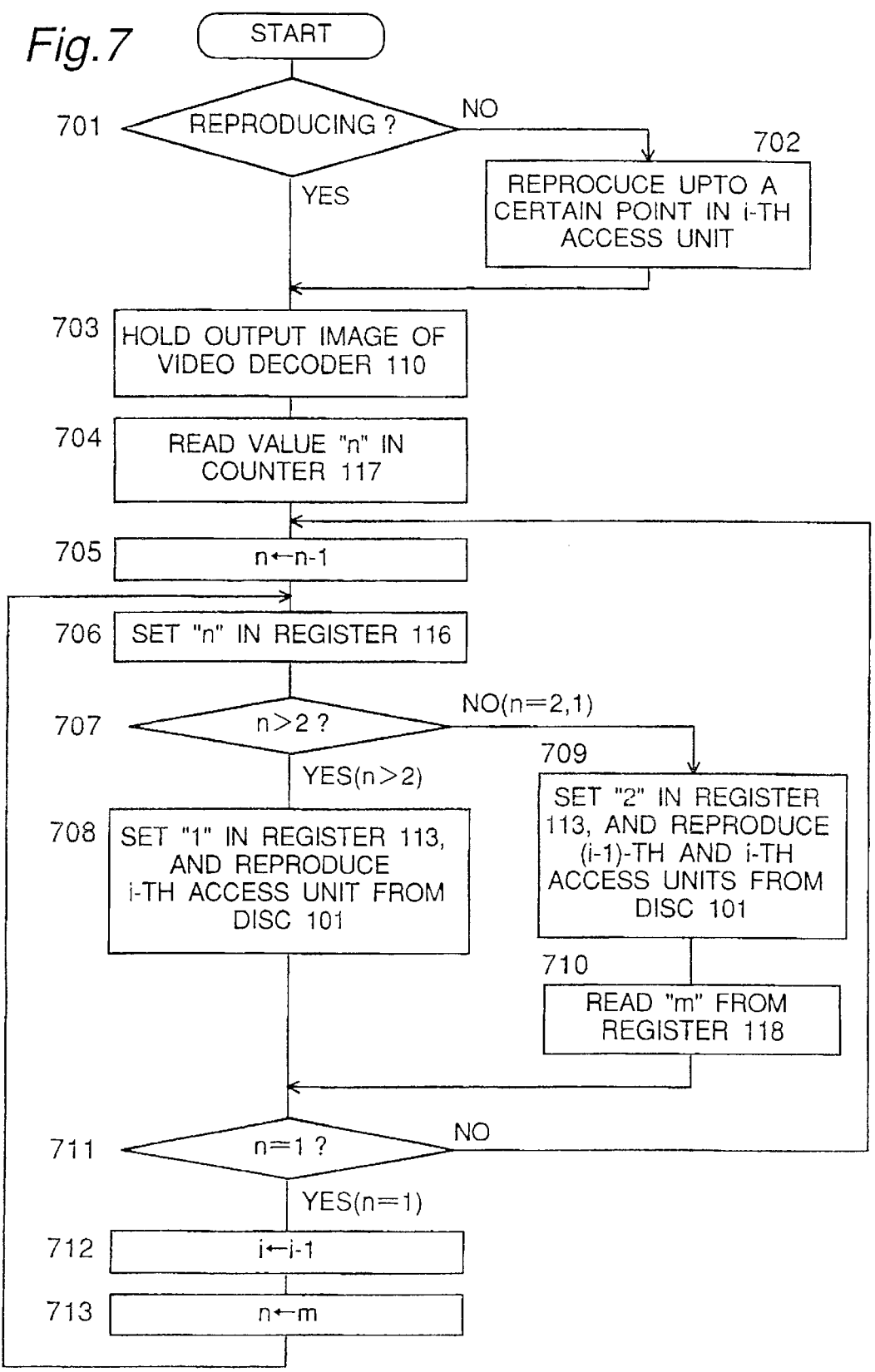
FIG. 7 is a flow chart used to describe the operation of an image information decoding and reproducing apparatus according to the third embodiment of the present invention.

The flow chart shown in FIG. 7 is similar to that shown in FIG. 5, but differs in steps 708 and 709. At step 708, 1 is set in register 113, and the i-th access unit is reproduced from disc 101. At step 709, 2 is set in register 113, and the (i−1)th and i-th access units are reproduced from disc 101.

The first step in this case is to read the data for the third access unit 403 from the optical disc 101 (FIG. 8B), and store the read data to the buffer memory 105 while simultaneously reading the stored data from the buffer memory 105 to the system decoder 109. When the buffer memory 105 becomes full, reproduction from the optical disc 101 is paused until sufficient data is read from the buffer memory 105 to enable the next data block to be stored. When sufficient space thus again becomes available in the buffer memory 105, reading from the optical disc 101 resumes. The system controller 107 controls this sequence of operations. Reproduction of the third access unit 403 from the optical disc 101 thus continues in the same manner (FIG. 8C). When the penultimate picture in the third access unit 403 need to be reproduced, data from the second and third access units 402 and 403 are reproduced form from the optical disc 101.

The data for the required access units is thus read from the optical disc 101 as many times as there are pictures in the third access unit 403. Whether only the data for the third access unit 403, or the data for both the second access unit 402 and the third access unit 403, is read from the optical disc 101 and sent to the system decoder 109 is determined, for example, by whether the data for the preceding access unit is needed to decode the picture to be reproduced.

The same basic operation is executed as shown in FIGS. 8F, 8G, 8H and 8I to read the data for the required access units from the optical disc 101 as many times as there are pictures in the second access unit 502. A moving picture sequence of any desired length can thus be reproduced picture by picture in reverse sequence by thereafter continuing to repeat the operation described above.

It should be noted that while the exemplary image information decoding and reproducing apparatus of the present invention has been described above as reproducing a moving picture sequence picture by picture, reverse reproduction of only I-pictures and P-pictures is also possible.

The invention is summarized as follows.

In this case reproduction is possible without using information from a preceding access unit, and it is therefore not necessary to read data from the preceding access unit. In the flow chart in FIG. 3, therefore, a value of "1" is set to the access unit count setting register 113 in step 305, only i-th access unit is read in step 306, only the data for i-th access unit is resent in step 309, and the number of pictures read in step 310 is the number of pictures in i-th access unit only.

It is therefore possible for an image information decoding and reproducing apparatus according to the present invention to decode and reproduce in reverse order all pictures in a moving picture sequence even when the image sequence contains interpicture coded pictures requiring information from an image in a preceding access unit for decoding. This is because the data for the access unit preceding the access unit containing the picture to be reproduced is read and stored to a buffer memory, and the data for any access unit needed to decode a picture to be reproduced is sent from the buffer memory to the decoder as many times as there pictures to be reproduced in the access unit.

It should be noted that while the auxiliary data packet is used to detect the beginning of an access unit in the exemplary image information decoding and reproducing apparatus described above, the invention shall not be so limited and any other means of detecting the beginning of an access unit can be alternatively used.

It is also noted that the numbers given for the pictures, such as 36 for the second access unit, and 48 for the first access unit, as well as 24 for the position X, are given merely as an example. Such numbers can be changed to s any other number according to the practical use.

Furthermore, the invention has been described with reference to a data stream compressed using the MPEG-2 model, but the invention shall not be so limited and can obviously be used with other compression methods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image information decoding and reproducing apparatus for reproducing image information in which a plurality of consecutive pictures in a moving picture signal are compressed into a single image unit through a predictive coding, said compressed image units being recorded to a recording medium in access units each containing one or a plurality of image units with auxiliary information added at the beginning of each access unit, said apparatus comprising:

an image information reading section for reading a specific access unit recorded to said recording medium from;

an image decoding section for decoding the image information read by the image information reading section;

an access unit counter for counting the number of access units read by said image information reading section;

a decoded picture counter for counting the number of pictures decoded by the image decoding section after said access unit counter has counted a predetermined value; and an image output section for outputting the decoded picture decoded by the image decoding section when the count detected by the decoded picture counter reaches a preselected value; and a controller for controlling the preselected value to decrement after each image output by said image output section.

2. An image information decoding and reproducing apparatus according to claim 1, wherein said access unit counter counts said auxiliary information recorded to the beginning of the access unit.

3. An image information decoding and reproducing apparatus according to claim 1, further comprising a buffer memory for storing the image information of said access unit read by the image information reading section, and repeatedly outputting the stored image information as required.

4. An image information decoding and reproducing apparatus according to claim 3, wherein said buffer memory has at least twice the capacity needed to store the image information contained in one access unit.

5. An image information decoding and reproducing method for reproducing a picture j (where j is a natural number) from the beginning of an access unit i (where i is a natural number), comprising:

reading (1+n) access units from (i-n)th access unit where n is a zero or a natural number;

decoding input image information;

detecting a beginning of (1+n)th access unit;

counting a number of pictures decoded from the beginning of (1+n)th access unit; and outputting the picture decoded when the number of the decoded picture becomes j.

6. An image information decoding and reproducing method according to claim 5, wherein detecting the beginning of an access unit is accomplished by detecting an auxiliary information recorded to the beginning of an access unit.

7. An image information decoding and reproducing method according to claim 5, wherein the value of n is one or zero.

8. An image information decoding and reproducing method according to claim 7, wherein the value of n is normally zero, and the value of n is set to one at least when information in access unit (i−1) is required to decode picture j from the beginning of access unit i.

9. An image information decoding and reproducing method according to claim 5, further comprising temporarily storing image information of (1+n) access units; and repeatedly outputting the stored image information.

10. An image information decoding and reproducing method according to claim 9 wherein temporarily storing image information is capable of storing at least twice the image information contained in one access unit.

* * * * *